March 19, 1940.  M. KLAVÍK  2,194,397
FRONT WHEEL SUSPENSION FOR AUTOMOBILES
Filed Feb. 21, 1939
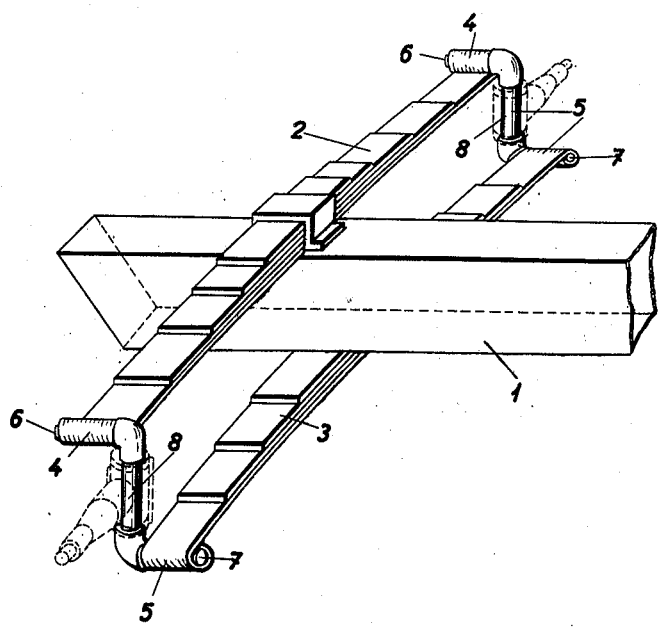
Inventor
Miloś Klavík
By Bilinger, Atty.

Patented Mar. 19, 1940

2,194,397

UNITED STATES PATENT OFFICE 2,194,397

FRONT WHEEL SUSPENSION FOR AUTOMOBILES

Miloš Klavík, Prague-Smichov, Czechoslovakia

Application February 21, 1939, Serial No. 257,722
In Czechoslovakia February 22, 1938

1 Claim. (Cl. 280—96.2)

The invention relates to an arrangement of the front wheel suspension of automobiles, more particularly of the kind in which two leaf springs mounted transversely above one another are fitted with pins at their ends about which the stub axles of the front wheels turn during steering.

In streamlined automobile bodies with rear engines, it is usual for attaining a correct streamlined shape of the body, for the driver's seat to be positioned forward so that the feet of the driver and if necessary those of the person sitting beside him extend beyond the front wheel suspension of the vehicle. Since, however, the bodies of automobiles of this kind should be low and the vehicles are likewise constructed very low, the upper leaf spring with axles of the abovementioned kind is exceedingly detrimental to comfortable seating.

According to this invention, this difficulty is obviated by suitable forward offsetting of the upper transverse spring relatively to the lower spring, the ends of the pins joining the spring ends being bent at right angles at the top and bottom and being inserted in the eyes at the ends of the springs, so that the connecting pins with the bent ends are shaped like the letter Z.

In this case, vertically acting forces do not subject the springs to torsional stresses, which is a substantial advantage of this arrangement. A constructional example of the invention is shown diagrammatically in the accompanying drawing.

Anchored in a suitable manner to the front end of the central member of the chassis body 1 of the vehicle are transverse leaf springs 2 and 3, which are offset relatively to one another by the upper spring 2 being positioned forwardly relatively to the lower spring 3. The ends of the springs 2 and 3 have eyes 4 and 5 for mounting the bent ends 6 and 7 of the pin 8 about which the stub axle of the front wheel of the vehicle turns during steering.

I claim:

A front wheel suspension for an automobile having a central chassis member, comprising two transverse leaf springs anchored at their middles to the chassis member, one of said springs being anchored forwardly of the other, eyes on the ends of said springs, a double right angled pin passing through the eyes of both springs at each end, stub axles for the wheels and provisions for supporting the stub axles at the centre of each pin between the spring eyes.

MILOŠ KLAVÍK.